(12) United States Patent
Kasper

(10) Patent No.: US 9,199,771 B2
(45) Date of Patent: Dec. 1, 2015

(54) NON-TACKY, TAMPER-EVIDENT LABEL

(71) Applicant: Brady Worldwide, Inc., Milwaukee, WI (US)

(72) Inventor: Matthew M. Kasper, Oak Creek, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 246 days.

(21) Appl. No.: 13/835,453

(22) Filed: Mar. 15, 2013

(65) Prior Publication Data
US 2014/0262902 A1 Sep. 18, 2014

(51) Int. Cl.
| B65D 55/06 | (2006.01) |
| B32B 3/10 | (2006.01) |
| B32B 7/04 | (2006.01) |
| B32B 27/32 | (2006.01) |
| B32B 27/38 | (2006.01) |
| B32B 7/06 | (2006.01) |
| B32B 27/08 | (2006.01) |
| B32B 27/36 | (2006.01) |
| G09F 3/00 | (2006.01) |
| G09F 3/02 | (2006.01) |

(52) U.S. Cl.
CPC . B65D 55/06 (2013.01); B32B 3/10 (2013.01); B32B 7/045 (2013.01); B32B 7/06 (2013.01); B32B 27/08 (2013.01); B32B 27/32 (2013.01); B32B 27/322 (2013.01); B32B 27/36 (2013.01); B32B 27/38 (2013.01); G09F 3/0292 (2013.01); G09F 2003/0229 (2013.01); Y10T 428/1405 (2015.01); Y10T 428/1452 (2015.01); Y10T 428/1467 (2015.01); Y10T 428/2486 (2015.01); Y10T 428/24851 (2015.01); Y10T 428/24868 (2015.01); Y10T 428/2848 (2015.01)

(58) Field of Classification Search
CPC .......... G09F 3/02; G09F 3/0292; G09F 3/03; G09F 3/0376; G09F 3/10; B65D 27/30; B65D 55/026; B65D 55/066
USPC ........................................................ 428/195.1
See application file for complete search history.

(56) References Cited

U.S. PATENT DOCUMENTS

| 4,082,873 | A | 4/1978 | Williams |
| 4,180,929 | A | 1/1980 | Schultz |
| 5,358,281 | A | 10/1994 | Greig |
| 5,582,887 | A | 12/1996 | Etheredge |
| 5,629,093 | A | 5/1997 | Bischof et al. |
| 5,770,283 | A | 6/1998 | Gosselin et al. |
| 6,361,079 | B1* | 3/2002 | Kirkman ......................... 283/81 |
| 6,416,857 | B1 | 7/2002 | Wright et al. |
| 7,060,353 | B2* | 6/2006 | Otten et al. .................... 428/354 |
| 2003/0056891 | A1* | 3/2003 | Schroder et al. ............. 156/234 |
| 2008/0020165 | A1 | 1/2008 | Drori |
| 2009/0091457 | A1 | 4/2009 | Kresse et al. |

FOREIGN PATENT DOCUMENTS

EP  1972674 A1  9/2008

* cited by examiner

*Primary Examiner* — Gerard Higgins
(74) *Attorney, Agent, or Firm* — Whyte Hirschboeck Dudek S.C.

(57) ABSTRACT

A tack-free, tamper-evident label comprising:
(A) A transparent, polymeric facesheet;
(B) A release ink in partial contact with the facesheet;
(C) A primecoat ink in partial contact with both the release ink and the facesheet;
(D) A polymeric film in contact with the primecoat ink;
(E) An adhesive in contact with the polymeric film; and
(F) An optional release liner in contact with the adhesive.

17 Claims, 3 Drawing Sheets

Figure 4A

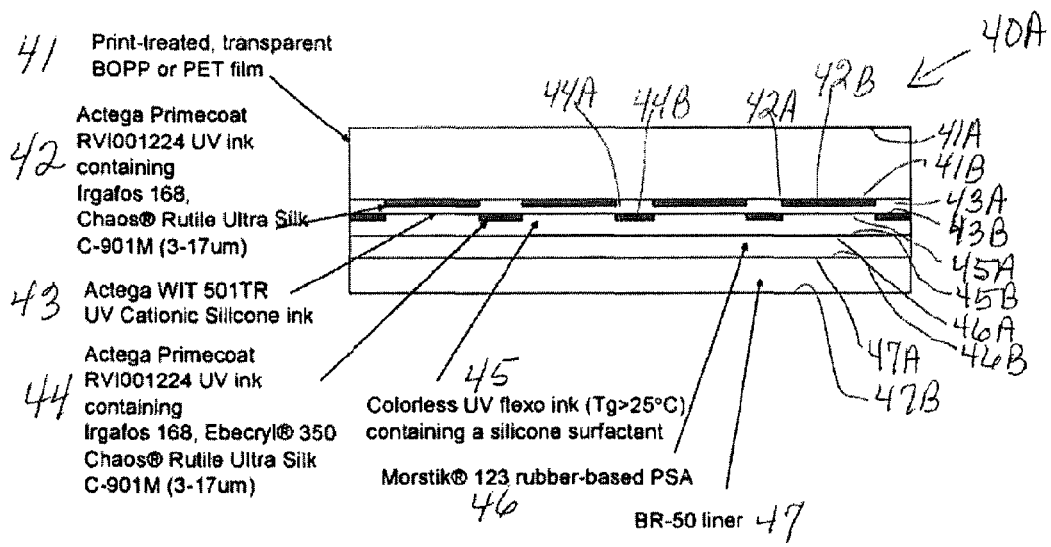

41 Print-treated, transparent BOPP or PET film
42 Actega Primecoat RVI001224 UV ink containing Irgafos 168, Chaos® Rutile Ultra Silk C-901M (3-17um)
43 Actega WIT 501TR UV Cationic Silicone ink
44 Actega Primecoat RVI001224 UV ink containing Irgafos 168, Ebecryl® 350 Chaos® Rutile Ultra Silk C-901M (3-17um)
45 Colorless UV flexo ink (Tg>25°C) containing a silicone surfactant
46 Morstik® 123 rubber-based PSA
47 BR-50 liner

Figure 4B

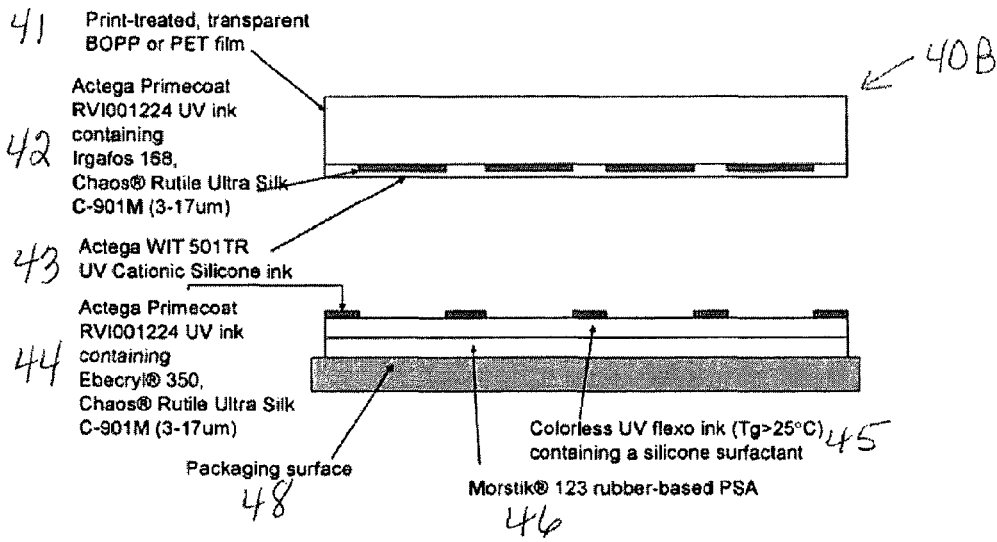

41 Print-treated, transparent BOPP or PET film
42 Actega Primecoat RVI001224 UV ink containing Irgafos 168, Chaos® Rutile Ultra Silk C-901M (3-17um)
43 Actega WIT 501TR UV Cationic Silicone ink
44 Actega Primecoat RVI001224 UV ink containing Ebecryl® 350, Chaos® Rutile Ultra Silk C-901M (3-17um)
45 Colorless UV flexo ink (Tg>25°C) containing a silicone surfactant
46 Morstik® 123 rubber-based PSA
48 Packaging surface ition# NON-TACKY, TAMPER-EVIDENT LABEL

FIELD OF THE INVENTION

This invention relates to labels. In one aspect the invention relates to tamper-evident labels while in another aspect, the invention relates to non-tacky, tamper-evident labels useful for sealing packaging edges or wristbands.

BACKGROUND OF THE INVENTION

Tamper-evident labels can be used in any application in which evidence is desired as to whether a package, container or other article has been opened or otherwise compromised. In one typical embodiment the label is placed over the joint or seam formed by a container and its lid or cap. If the container is opened, the label is damaged in a manner that records the opening, e.g., the label is separated into various pieces, discolored, etc. In another embodiment, the label might be peeled up to open a seal, and in doing so damage is done to the laminate structure.

In many common embodiments the label disassembles into two pieces which provides excellent evidence that the package or other object to which is was attached was opened or otherwise compromised. However, in many of these embodiments, the label disassembles in a manner leaving one or both parts sufficiently tacky and undamaged so as to allow the label to be re-assembled and thus obscure, if not hide, the fact that the package was opened. Accordingly, of interest is a tamper-evident label that cannot be re-assembled simply by re-joining the pieces using nothing more than the original adhesive content of the label.

SUMMARY OF THE INVENTION

In one embodiment the invention is a tack-free, tamper-evident label comprising:
(A) A transparent, polymeric facesheet having first and second facial surfaces;
(B) A release ink having first and second facial surfaces, the first facial surface of the release ink in partial contact with the second facial surface of the facesheet;
(C) A primecoat ink having first and second facial surfaces, the first facial surface of the primecoat ink in partial contact with both the second facial surface of the release ink and the second facial surface of the facesheet;
(D) A polymeric film having first and second facial surfaces, the first facial surface of the polymeric film in contact with the second facial surface of the primecoat ink;
(E) An adhesive having first and second facial surfaces, the first facial surface of the adhesive in contact with the second facial surface of the polymeric film; and
(F) An optional release liner with first and second facial surfaces, the first facial surface of the optional release liner in contact with the second facial surface of the adhesive.

In one embodiment the invention is a tack-free, tamper-evident label comprising:
(A) A transparent, polymeric facesheet having first and second facial surfaces;
(B) A polymeric primer having first and second facial surfaces, the first facial surface of the polymeric primer in partial contact with the second facial surface of the facesheet;
(C) A primecoat ink having first and second facial surfaces, the first facial surface of the primecoat ink in partial contact with both the second facial surface of the polymeric primer and the second facial surface of the facesheet;
(D) A polymeric film having first and second facial surfaces, the first facial surface of the polymeric film in contact with the second facial surface of the primecoat ink;
(E) An adhesive having first and second facial surfaces, the first facial surface of the adhesive in contact with the second facial surface of the polymeric film; and
(F) An optional release liner with first and second facial surfaces, the first facial surface of the optional release liner in contact with the second facial surface of the adhesive.

In one embodiment the invention is a tack-free, tamper-evident label comprising:
(A) A transparent, polymeric facesheet having first and second facial surfaces;
(B) A first primecoat ink having first and second facial surfaces, the first facial surface of the first primecoat ink in partial contact with the second facial surface of the facesheet;
(C) A release ink having first and second facial surfaces, the first facial surface of the release ink in partial contact with both the second facial surface of the first primecoat ink and the second facial surface of the facesheet;
(D) A second primecoat ink having first and second facial surfaces, the first facial surface of the second primecoat ink in partial contact with the second facial surface of the release ink;
(E) A flexo ink having first and second facial surfaces, the first facial surface of the flexo ink in contact with both the second facial surface of the second primecoat ink and the second facial surface of the release ink;
(F) An adhesive having first and second facial surfaces, the first facial surface of the adhesive in contact with the second facial surface of the flexo ink; and
(G) An optional release liner with first and second facial surfaces, the first facial surface of the optional release liner in contact with the second facial surface of the adhesive.

BRIEF DESCRIPTION OF THE DRAWINGS

FIG. 4A is a schematic drawing of one embodiment of a tamper-evident label of this invention before disassembly and comprising both a primecoat and release ink layer.
FIG. 4B is FIG. 4A after disassembly.

DETAILED DESCRIPTION OF THE PREFERRED EMBODIMENT

Definitions

Figure 1A:
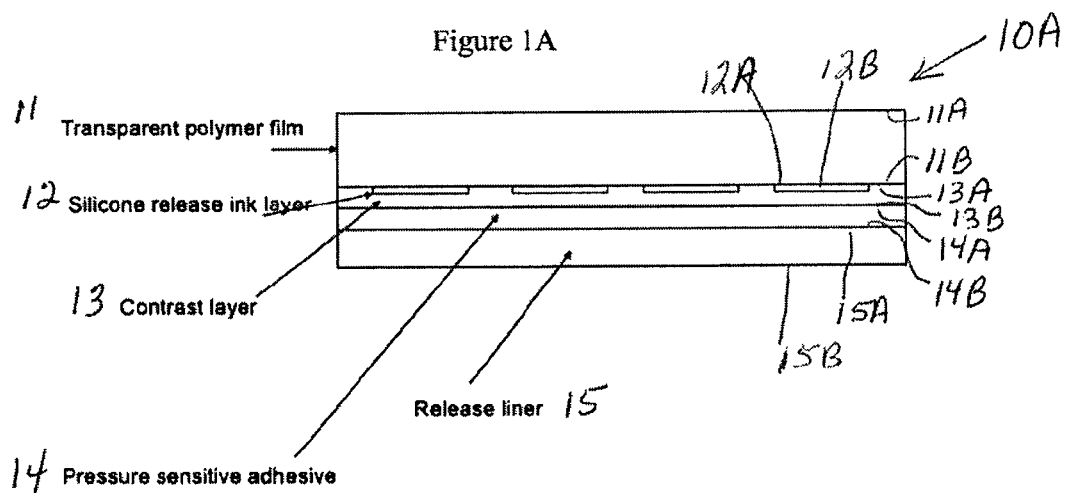
FIG. 1A is a schematic drawing of a commercially available tamper-evident label before disassembly.

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, layer or label thickness, is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical values and ranges are provided within this disclosure for, among other things, layer and label thickness and the like.

"Layer" means a single thickness, coating or stratum spread out or covering a surface.

"Multilayer" means at least two layers.

"Facial surface", "planar surface" and like terms mean the flat surfaces of the layers that are in contact with the opposite and adjacent surfaces of the adjoining layers. Facial surfaces are in distinction to edge surfaces. A rectangular layer or label comprises two facial surfaces and four edge surfaces. A circular layer or label comprises two facial surfaces and one continuous edge surface.

"In contact", "in direct contact", "in intimate contact" and like terms mean that one facial surface of one layer and one facial surface of another layer, or the adhesive layer of a label and the exterior surface of an object or substrate to which the adhesive layer of the label is applied, are in an adhering relationship to one another without an intermediate layer, such as a coating is in an adhering relationship with the substrate to which it is applied.

"In partial contact" and like terms mean that only a part of a facial surface of a layer is in contact with a facial surface of an adjacent layer. Typically this means that the surface area of one facial surface of one layer is less than the surface area of the adjacent facial surface of another layer.

"Tack-free" and like terms mean, in the context of a tamper-evident label, that the pieces of a label disassembled due to the opening of a package or container to which the label was attached have insufficient exposed PSA to allow re-assembly of the label without the need for additional adhesive. In other words, tack-free means that both sides of a disassembled label cannot be made to re-adhere even when pressure is applied.

"Transparent" means that some (e.g., greater than or equal to ($\geq$) 5%, or $\geq$10%, or $\geq$20%, or $\geq$30% or $\geq$40%), preferably most (e.g., $\geq$50%, or $\geq$60%, or $\geq$70%, or $\geq$80%), or all or virtually all (e.g., $\geq$90%, or $\geq$95%) of the visible spectrum of the electromagnetic spectrum to which a film or layer is exposed will pass through the film or layer. In this context transparent includes translucent. The visible spectrum is the portion of the electromagnetic spectrum that is visible to (can be detected by) the human eye. A typical human eye will respond to wavelengths from about 390 to 700 nanometers (nm).

"Graphic", "graphic image" and like terms mean text or pictorial representations formed of ink or other dye or pigments substances. Graphic images include, but are not limited to, words, numbers, bar codes, pictures, designs (geometric or otherwise), and solid colors (typically applied by flood coating).

"Ink" and like terms mean a coatable or printable formulation that can and usually does contain a dye and/or pigment.

"Pigment" and like terms mean a visible light absorbing material or compound that is present in a non-molecularly dispersed (particulate) form.

"Dye" and like terms mean a visible light absorbing compound that is present in a molecularly dispersed (dissolved) form.

Conventional Label Construction

FIG. 1A is a schematic of a commercially available, tamper-evident label before it is disassembled. Label 10A comprises transparent polymeric film 11 having first and second opposing facial surfaces 11A and 11B with first facial surface 11A open to the environment and second facial surface 11B in contact with both first facial surface 12A of release ink 12 and first facial surface 13A of contrast layer 13. Release ink 12 is applied to second surface 11B of polymer film 11 in such a manner and by any convenient means, e.g., gravure printing, that at least a part of second facial surface 11B is available for contact with at least a part of first facial surface 13A of contrast layer 13. Release ink 12 can be applied to second facial surface 11B such that the ink layer is continuous or discontinuous.

Pressure sensitive adhesive (PSA) 14 is applied to contrast layer 13 such that second facial surface 13B is in contact with first facial surface 14A. Second facial surface 14B of PSA layer 14 is in contact with first facial surface 15A of release liner 15.

To apply label 10A to surface 16 (FIG. 1B) of an object or article, e.g., package or container, release liner 15 is simply peeled from adhesive layer 14, and label 10A is applied to the surface such that PSA 14 is in contact with it. Label 10A is typically applied to the package or container at the seam or joint formed by the package or container and its lid, cap or other part that upon removal allows entry into the package or container.

Figure 1B:
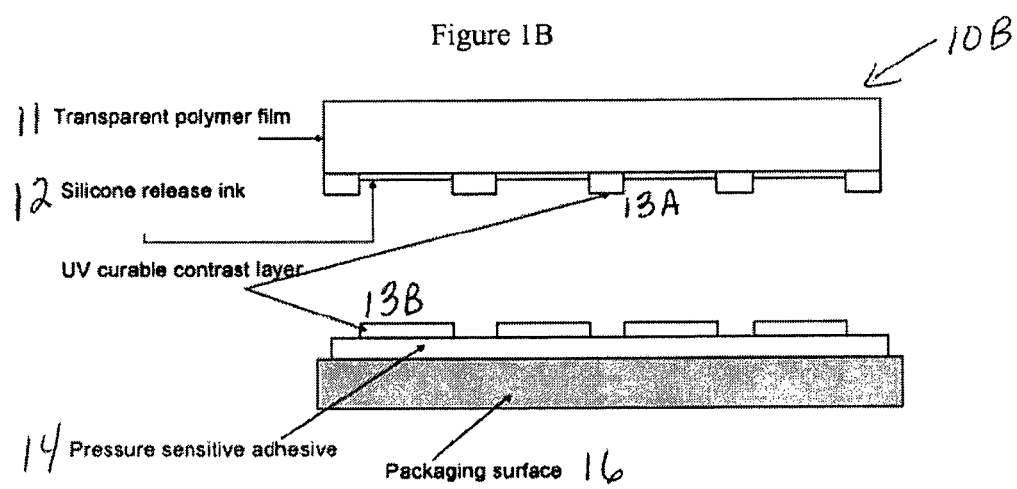
FIG. 1B is FIG. 1A after disassembly.

FIG. 1B is a schematic of Label 10A in disassemble form. As noted above, the label is attached to, for example, a package such that opening of the package requires disassembly of the label. The label is constructed in a manner that it will divide into two pieces such that release ink 12 will remain with polymer film 11, PSA 14 will remain attached to package surface 16, and contrast layer 13 will split such that part (13A) will remain with polymer film 11 and part (13B) will remain with PSA 14. While this provides excellent evidence that the package was opened, the exposed PSA remains sufficiently tacky that it allows for a relatively easy re-joining of the label pieces. If the label is not otherwise damaged during the opening process, then the label may be re-joined in a manner that makes it difficult to detect if the package was opened.

Inventive Label Construction, Embodiment One

Figure 2A:
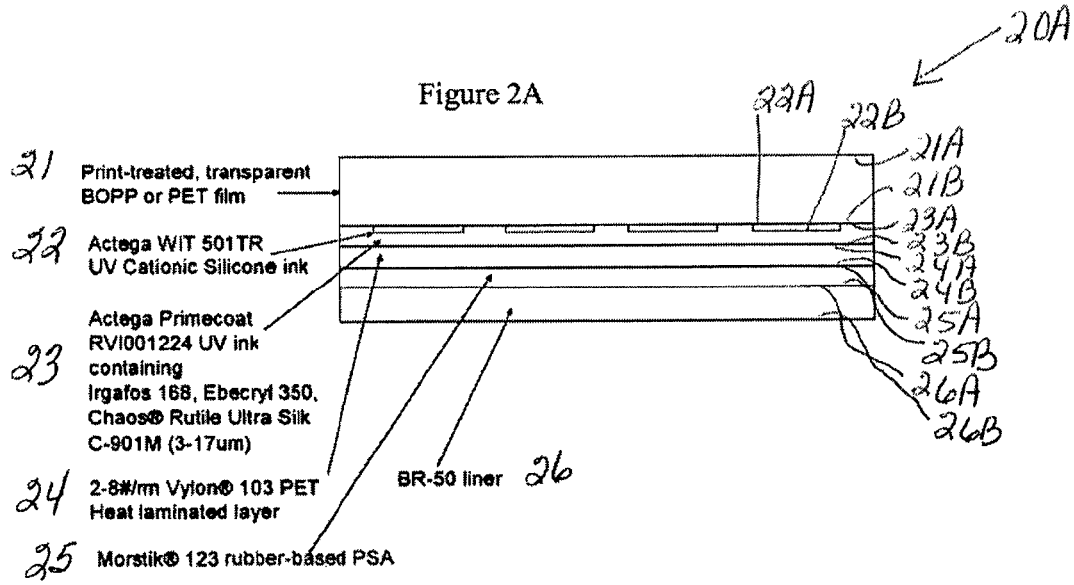
FIG. 2A is a schematic drawing of one embodiment of a tamper-evident label of this invention before disassembly and comprising a release ink layer.

FIG. 2A is a schematic of one embodiment of a tack-free, tamper-evident label of this invention before it is disassembled. Label 20A comprises transparent polymeric film 21 having first and second opposing facial surfaces 21A and 21B with first facial surface 21A open to the environment and second facial surface 21B in contact with both first facial surface 22A of release ink 12 and first facial surface 23A of primecoat 23. Release ink 22 is applied to second surface 21B of polymer film 21 in such a manner and by any convenient means, e.g., gravure printing, that at least a part of second facial surface 21B is available for contact with at least a part of first facial surface 23A of primecoat 23. Release ink 22 can be applied to second facial surface 21B such that the ink layer is continuous or discontinuous.

Polymeric film 24 is applied to primecoat 23 such that second facial surface 23B is in contact with first facial surface 24A. Second facial surface 24B of polymeric film 24 is in contact with first facial surface 25A of PSA 25.

PSA 25 is applied to polymeric layer 24 such that second facial surface 24B is in contact with first facial surface 25A. Second facial surface 25B of PSA layer 25 is in contact with first facial surface 26A of release liner 26.

Figure 2B:
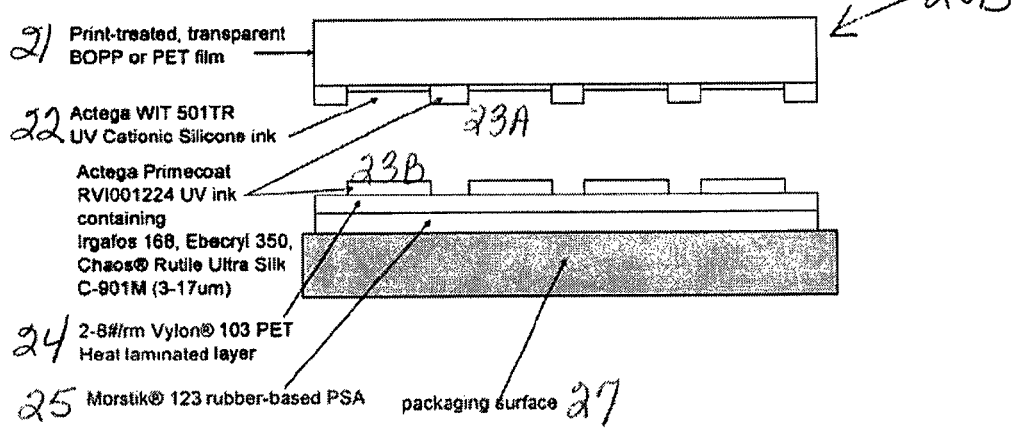
FIG. 2B is FIG. 2A after disassembly.

FIG. 2B is a schematic of Label 20A in disassemble form. Label 20A is attached to a package in the same manner as Label 10A such that opening of the package requires disassembly of the label. Label 20A is constructed in a manner that it will divide into two pieces such that release ink 22 will remain with polymer film 21, polymeric film 24 and PSA 25 will remain attached to package surface 27, and primecoat 23 will split such that part (23A) will remain with polymer film 21 and part (23B) will remain with polymeric film 24. Not only does this construction provide excellent evidence that the package was opened, but the PSA is now covered with the polymeric film and as such, easy re-assembly of label 20A is thwarted because its separated pieces are tack-free.

As an example of one method of construction of the label of FIG. 2A a transparent print-treated biaxially oriented polypropylene or transparent print-treated polyester film substrate having opposing top and bottom surfaces is employed as the facesheet. A colorless, UV cationic silicone release (i.e. ACTEGA WIT KRC 501TR or TEGO® Epoxy silicone (98P TEGO® RC1412: 2P TEGO® 1467) coating is flexo or gravure pattern printed on a portion of the bottom surface of the polypropylene or polyester film substrate. Next, a UV free-radical flexo ink containing pigments (e.g., white pearlescent pigments such as Sun Chemical's CHAOS Rutile Ultra Silk C-901M), a silicone diacrylate (i.e. EBECRYL 350) wetting agent, and a phosphite antioxidant for adhesion promotion (i.e. IRGAFOS 168 in toluene) is continuously flexo-applied to the bottom surface of the release ink, and the exposed bottom surface of the polypropylene or polyester film substrate. The free radical ink bonds very well to the bottom side of the film substrate but does not bond well to the bottom surface of the UV cationic release layer. Subsequently, a thermoplastic polyester (e.g., VYLON 103 or VYLON 200) cast film is heat-laminated to the bottom surface of the UV free radical flexo ink. Without the thermoplastic polyester layer, the portion of the label containing no release would be very tacky. Afterwards, the casting liner is removed, and a permanent self-wound adhesive (i.e. MORSTIK 123) is laminated to the lower surface of the VYLON 103 polyester layer.

Inventive Label Construction, Embodiment Two

Figure 3A:
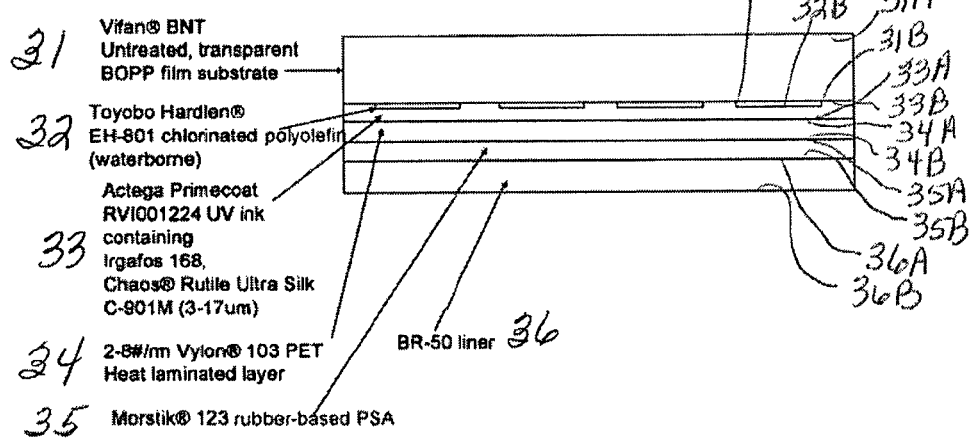
FIG. 3A is a schematic drawing of one embodiment of a tamper-evident label of this invention before disassembly and comprising a chlorinated polyolefin layer.

FIG. 3A is a schematic of one embodiment of a tack-free, tamper-evident label of this invention before it is disassembled. Label 30A comprises transparent polymeric film 31 having first and second opposing facial surfaces 31A and 31B with first facial surface 31A open to the environment and second facial surface 31B in contact with both first facial surface 32A of polymeric primer 32 and first facial surface 33A of primecoat 33. Polymeric primer 32 is applied to second surface 31B of polymer film 31 in such a manner and by any convenient means, e.g., gravure printing, that at least a part of second facial surface 31B is available for contact with at least a part of first facial surface 33A of primecoat 33. Polymeric primer 32 can be applied to second facial surface 31B such that the primer layer is continuous or discontinuous.

Polymeric film 34 is applied to primecoat 33 such that second facial surface 33B is in contact with first facial surface 34A. Second facial surface 34B of polymeric film 34 is in contact with first facial surface 35A of PSA 35.

PSA 35 is applied to polymeric layer 34 such that second facial surface 34B is in contact with first facial surface 35A. Second facial surface 35B of PSA layer 35 is in contact with first facial surface 36A of release liner 36.

Figure 3B:
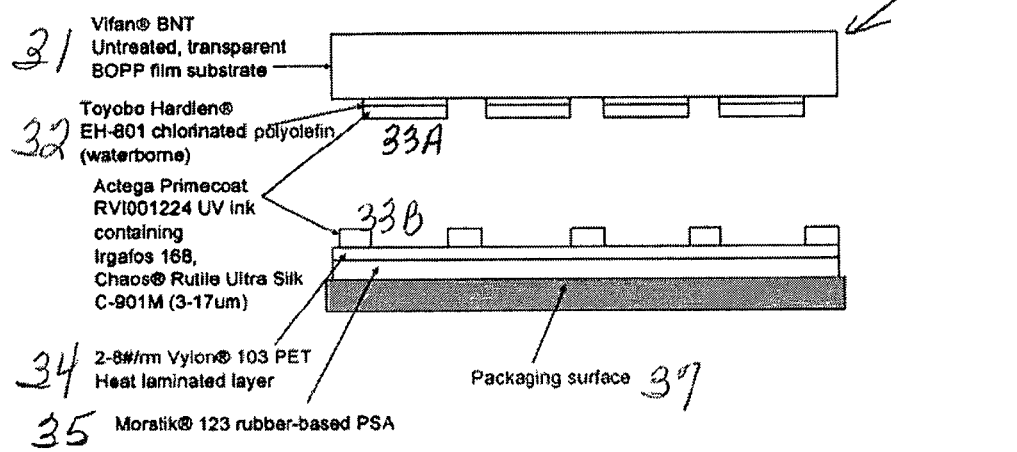
FIG. 3B is FIG. 3A after disassembly.

FIG. 3B is a schematic of label 30A in disassemble form. Label 30A is attached to a package in the same manner as labels 10A and 20A such that opening of the package requires disassembly of the label. Label 30A is constructed in a manner that it will divide into two pieces such that polymeric primer 32 will remain with polymer film 31, polymeric film 34 and PSA 35 will remain attached to package surface 37, and primecoat 33 will split such that part (33A) will remain with polymeric primer 32 and part (33B) will remain with polymeric film 34. Not only does this construction provide excellent evidence that the package was opened, but the PSA is now covered with the polymeric film and as such, easy re-assembly of label 30A is thwarted because its separated pieces are tack-free.

As an example of one method of construction of the label of FIG. 3A a transparent print-treated biaxially oriented polypropylene or transparent print-treated polyester film substrate having opposing top and bottom surfaces is employed as the facesheet. A UV free radical primecoat ink containing pigments (i.e. a white pearlescent pigments such as Sun Chemical's CHAOS Rutile Ultra Silk C-901M), and a phosphite antioxidant (i.e. IRGAFOS 168 in toluene) for adhesion promotion to the HARDLEN EH-801 primer layer is continuously flexo applied to said lower surface of the HARDLEN EH-801 layer and the exposed bottom surface of the untreated polypropylene film substrate. The free radical ink bonds very well to the bottom side of the HARDLEN primer layer but does not bond well to the lower surface of the untreated polypropylene film substrate. Subsequently, a thermoplastic polyester (i.e. VYLON 103 or VYLON 200) cast film is heat-laminated to the lower surface of the UV free radical flexo ink. Without the thermoplastic polyester layer, the product does not tamper cleanly and adhesive is exposed on the packaging. Afterwards, the casting liner is removed, and the permanent self-wound adhesive (i.e. MORSTIK 123) is laminated to the lower surface of the VYLON 103 polyester layer.

Inventive Label Construction, Embodiment Three

FIG. 4A is a schematic of one embodiment of a tack-free, tamper-evident label of this invention before it is disassembled. Label 40A comprises transparent polymeric film 41 having first and second opposing facial surfaces 41A and 41B with first facial surface 41A open to the environment and second facial surface 41B in contact with both first facial surface 42A of first primecoat ink 42 and first facial surface 43A of release ink 43. First primecoat ink 42 is applied to second surface 41B of polymer film 41 in such a manner and by any convenient means, e.g., gravure printing, that at least a part of second facial surface 41B is available for contact with at least a part of first facial surface 43A of release ink 43. First primecoat ink 42 can be applied to second facial surface 41B such that the primer layer is continuous or discontinuous.

Second primecoat ink 44 is applied to second surface 43B of release ink 43 in such a manner and by any convenient means, e.g., gravure printing, that at least a part of second facial surface 43B is available for contact with at least a part of first facial surface 45A of flexo ink 45. Second primecoat ink 44 can be applied to second facial surface 43B such that the second primecoat layer is continuous or discontinuous. Typically the second primecoat ink is applied in a manner that it does not overlap the first primecoat ink.

PSA 46 is applied to flexo ink 45 such that second facial surface 45B is in contact with first facial surface 46A. Second facial surface 46B of PSA layer 46 is in contact with first facial surface 47A of release liner 47.

FIG. 4B is a schematic of label 40A in disassemble form. Label 40A is attached to a package in the same manner as labels 10A, 20A and 30A such that opening of the package requires disassembly of the label. Label 40A is constructed in a manner that it will divide into two pieces such that first primecoat ink 42 and release ink 43 will remain with polymer film 41 while second primecoat ink 44, flexo ink 45 and PSA 46 will remain attached to package surface 48. Not only does this construction provide excellent evidence that the package was opened, but the PSA is covered with the flexo ink and as such, easy re-assembly of label 40B is thwarted because its separated pieces are tack-free.

As an example of one method of construction of the label of FIG. 4A a transparent print-treated biaxially oriented polypropylene or transparent print-treated polyester film substrate having opposing top and bottom surfaces is employed as the facesheet. A UV, free-radical primecoat ink containing pigments (e.g., white pearlescent pigments and a phosphite antioxidant (i.e. IRGAFOS 168 in toluene) for adhesion promotion is positive printed utilizing a flexo press to the bottom surface of the print-treated polypropylene substrate. Next, a colorless, UV cationic silicone release (i.e. ACTEGA WIT KRC 501TR or TEGO Epoxy silicone (98P TEGO RC1412: 2P TEGO 1467) coating is continuously applied to a portion of said bottom surface of the polypropylene film substrate and the bottom surface of the free-radical primecoat ink. Subsequently, a UV free-radical primecoat ink containing pigments (the same as used to print the facesheet) is reverse printed in register to the first UV free-radical primecoat ink layer to the bottom surface of the silicone release. The free radical ink does not bond well to the bottom surface of the UV cationic release layer. Thereafter, a colorless, UV-flexo ink (i.e. ACTEGA WIT 159TTNB) containing a silicone wetting agent is continuously applied to the bottom surface of the UV cationic ink. Without the colorless UV flexo ink, a portion of the tampered material would be tacky. Lastly, the permanent self-wound adhesive (i.e. MORSTIK 123) is laminated to the bottom surface of the colorless UV flexo ink layer.

Label Components

The facesheet of the three inventive label constructions described above can be prepared from a wide variety of different polymers including, but not limited to, polyester, polyolefin, polyimide, polycarbonate, acrylic, and composite constructions. Typically and preferably the facesheet is prepared from polyester, particularly a polyethylene terephthalate (PET) ester or a biaxially-oriented polypropylene (BOPP). The facesheet is typically in the form of a film with a typical thickness of 0.002 inches (0.0508 mm) to 0.010 inches (0.254 mm), more typically of 0.003 inches (0.0762 mm) to 0.007 inches (0.1778 mm).

In one embodiment the first facial surface of the facesheet, e.g., 21A, 31A or 41A, is coated with an optional topcoat. The composition of the optional topcoat can vary widely. In one embodiment the topcoat comprises a crosslinked polyester binder while in other embodiments the topcoat comprises polyurethane, acrylic, phenoxy, or melamine polymers. The topcoat, if present, typically has a thickness of 0.00254 mm to 0.0381 mm, more typically of 0.00254 mm to 0.01524 mm.

The release ink used in the first and third embodiments of the inventive label constructions described above can be selected from a wide variety of available materials. Any ultra-violet (UV) epoxy silicone cationic ink containing a cationic photoinitiator, such as iodonium and/or triarylsulphonium salts may be utilized. ACTEGA WIT 501TR UV cationic and TEGO epoxy silicone UV cationic release inks, e.g., TEGO RC 1401, RC 1403 and/or RC 1412 with TEGO photo-catalyst, are representative. Alternative solvent- or water-borne release inks include fluoropolymers and polyvinyl alcohols. The release ink typically has a thickness of 0.00127 mm to 0.0127 mm, more typically of 0.00127 mm to 0.00508 mm, and it is typically applied in a manner to form a graphic image visible through the facesheet.

In one embodiment the primecoat ink used in all three embodiments of the inventive label construction described above is a UV ink, e.g., ACTEGA Primecoat RV1001224 UV ink, typically in combination with one or more of a phosphite antioxidant, e.g., IRGAFOS 168 from Ciba Specialty Chemicals (0.5%-3% by mass), a UV/EB (ultra-violet/electron beam) curable resin, e.g., EBECRYL 350 (a silicone diacrylate) from Cytec (0.5%-4% by mass), and a pigment, e.g., CHAOS rutile ultra-silk C-901M (3-17 microns) from 5%-30% by mass. In other embodiments the ACTEGA primecoat ink can be replaced by or combined with one or more primecoat inks based on free-radical polyester acrylate, aliphatic or aromatic polyurethane acrylate, epoxy acrylate, monomers (including but not limited to 1,6-hexanediol diacrylate, isobornyl acrylate, octyl/decyl acrylate, oxyethylated phenol acrylate, aliphatic acrylate, 2-phenoxyethyl acrylate, dipropylene glycol giacrylate, tripropylene glycol diacrylate, alicyclic diacrylate, bisphenol-A ethoxylate diacrylate, acrylated dipentaerythritol, propoxylated glycerol triacrylate, trimethylolpropane ethoxy triacrylate, ditrimethyolpropanetetraacrylate, pentaerythritol tri-tetraacrylate, polyether tetraacrylate and propoxylated glycerol triacrylate), typically in combination with a free-radical photoinitiator. Other pigments that can be used in this primecoat ink layer include CHAOS interference pigments, metallic coated pearl pigments and/or white pearl pigments, IRIODIN effect pigments, BI-FLAIR effect pigments, titanium dioxide, silicon dioxide, carbon black and the like. The primecoat ink layer typically has a thickness of 0.00127 mm to 0.0127 mm, more typically of 0.00127 mm to 0.00508 mm.

In one embodiment the polymeric film used in the first and second embodiments of the inventive label construction described above is made from VYLON 103 polyester resin from Toyobo. In other embodiments the VYLON 103 polyester resin can be made from one or more other thermoplastic polyester resin, or polyurethane, synthetic rubber, polyvinyl chloride, or acrylic, resin. In one embodiment the polymeric film has a glass transition temperature (Tg) of greater than 25° C., preferably greater than 45° C., so that it and the layer or layers with which it is in contact (other than the PSA layer) are tack-free upon separation, i.e., after tampering, and at room temperature, e.g., 23° C. The tensile strength (measured by ASTM D412) of the polymeric film is in the range of 1 pounds per inch (lb/in) width to 15 lb/in width, typically in the range of 1.0 lb/in width to 10 lb/in width and more typically in the range of 1.0 lb/in width to 5 lb/in width. If the tensile strength of polymeric film exceeds the upper end of the broad range, then the tampered portion remaining on the package or container after label disassembly may be removed in one piece and this, in turn, could obstruct a determination that the package or container ever carried a tamper-evident label. If the tensile strength of the polymeric film is within the above ranges, particularly toward the lower end of these ranges, then it will break into many pieces if removal from the package or container surface is attempted. The polymeric film layer typically has a thickness of 0.00254 mm to 0.0254 mm, more typically of 0.00254 mm to 0.0127 mm.

In one embodiment the polymeric primer used in the second embodiment of the inventive label construction described above is made from a solvent free, water-based chlorinated polypropylene emulsion such as HARDLEN EH-801 from Toyobo. This polymeric primer provides strong adhesion to polypropylene and polypropylene/EPDM substrates and as such, is excellent for use with a BOPP facesheet. In other embodiments the HARDLEN EH-801 can be replaced or supplemented with one or more chlorinated polyolefin resins, chlorinated polyolefin modified with maleic anhydride, or styrene-ethylene/butylene-styrene (SEBS) polymers maleic anhydride (MA) grafted onto the rubber midblock. These alternative polymeric primers also provide good adhesion to an untreated BOPP film. The polymeric primer layer typically has a thickness of 0.00127 mm to 0.0127 mm, more typically of 0.00127 mm to 0.00508 mm.

In one embodiment the flexo ink used in the third embodiment of the inventive label construction described above is a colorless, transparent and colored, or opaque and colored UV flexo ink with a Tg of greater than 25° C. and containing a silicone wetting agent such as Ebecryl 350 typically added at 0.5% to 3% by mass and more typically at 0.5% by mass to 1% by mass. ACTEGA WIT 159TTNB UV free radical ink supplied by Altana is representative of these inks.

The adhesive used in all three embodiments of the inventive label construction described above can vary widely, and it includes, but is not limited to, materials comprising permanent pressure sensitive acrylic and rubber hybrid acrylic, and rubber pressure sensitive adhesives. In one embodiment a thermoset polyester or polyurethane adhesive may be utilized. The thickness of the adhesive layer typically is in the range of 0.0005 inches (0.0127 mm) to 0.003 inches (0.0762 mm), more typically of 0.0009 inches (0.02286 mm) to 0.002 inches (0.0508 mm).

The release liner used in all three embodiments of the inventive label construction described above can also vary widely, and is typically silicone coated to protect the adhesive until application to a package or container and to carry the label stock through a printer. The preferred release liner is either a film type, or a coated paper to give the adhesive a smooth surface to minimize entrapped air when bonded to the end-use surface.

In one embodiment and for ease of use in high volume manufacturing, the labels are packaged in roll form. In this embodiment the release liner is in the form of a strip of indefinite length wound about a spool or similar object. Individual labels are removed from the roll as needed and applied to the package or container in the same manner as tacky, tamper-evident labels.

It is specifically intended that the present invention not be limited to the embodiments and illustrations contained herein, but include modified forms of those embodiments including portions of the embodiments and combinations of elements of different embodiments as come within the scope of the following claims.

I claim:

1. A label comprising:
   (A) A transparent, polymeric facesheet having first and second facial surfaces;
   (B) A dried, colorless release ink layer (1) comprising an ultra-violet (UV) light, cationically cured epoxy silicone ink, and (2) having first and second facial surfaces, the first facial surface of the dried, colorless release ink layer in contact with the second facial surface of the facesheet;
   (C) A dried primecoat ink layer (1) comprising a UV-cured ink in combination with one or more of a phosphite antioxidant or a pigment, and (2) having first and second facial surfaces, the first facial surface of the dried primecoat ink layer in contact with the second facial surface of the dried, colorless release ink layer and in partial contact with the second facial surface of the facesheet;
   (D) A polymeric film having first and second facial surfaces, the first facial surface of the polymeric film in contact with the second facial surface of the dried primecoat ink layer;
   (E) An adhesive layer having first and second facial surfaces, the first facial surface of the adhesive layer in contact with the second facial surface of the polymeric film; and
   (F) An optional release liner with first and second facial surfaces, the first facial surface of the optional release liner in contact with the second facial surface of the adhesive layer.

2. The label of claim 1 in which the polymeric film comprises a thermoplastic polyester.

3. The label of claim 1 further comprising a topcoat in contact with the first facial surface of the facesheet.

4. The label of claim 1 in which the facesheet comprises polyester or a biaxially-oriented polypropylene resin.

5. A release liner in the form of a roll carrying a plurality labels of claim 1.

6. A package or container bearing a label of claim 1.

7. A label comprising:
   (A) A transparent, polymeric facesheet having first and second facial surfaces;
   (B) A polymeric primer layer (1) comprising a chlorinated polypropylene, and (2) having first and second facial surfaces, the first facial surface of the polymeric primer layer in contact with the second facial surface of the facesheet;
   (C) A dried primecoat ink layer (1) comprising a UV-cured ink in combination with one or more of a phosphite antioxidant or a pigment, and (2) having first and second facial surfaces, the first facial surface of the dried primecoat ink layer in contact with the second facial surface of the polymeric primer layer and in partial contact with the second facial surface of the facesheet;

(D) A polymeric film having first and second facial surfaces, the first facial surface of the polymeric film in contact with the second facial surface of the dried primecoat ink layer;
(E) An adhesive layer having first and second facial surfaces, the first facial surface of the adhesive layer in contact with the second facial surface of the polymeric film; and
(F) An optional release liner with first and second facial surfaces, the first facial surface of the optional release liner in contact with the second facial surface of the adhesive layer.

8. The label of claim 7 in which the polymeric film comprises a thermoplastic polyester.

9. The label of claim 7 further comprising a topcoat in contact with the first facial surface of the facesheet.

10. The label of claim 7 in which the facesheet comprises polyester or a biaxially-oriented polypropylene resin.

11. A release liner in the form of a roll carrying a plurality labels of claim 7.

12. A package or container bearing a label of claim 7.

13. A label comprising:
(A) A transparent, polymeric facesheet having first and second facial surfaces;
(B) A dried first primecoat ink layer (1) comprising a UV-cured ink in combination with one or more of a phosphite antioxidant or a pigment, and (2) having first and second facial surfaces, the first facial surface of the dried first primecoat ink layer in contact with the second facial surface of the facesheet;
(C) A dried, colorless release ink layer (1) comprising an ultra-violet (UV) light, cationically cured epoxy silicone ink, and (2) having first and second facial surfaces, the first facial surface of the dried, colorless release ink layer in contact with the second facial surface of the dried first primecoat ink layer and in partial contact with the second facial surface of the facesheet;
(D) A dried second primecoat ink layer (1) comprising a UV-cured ink in combination with one or more of a phosphite antioxidant or a pigment, and (2) having first and second facial surfaces, the first facial surface of the dried second primecoat ink layer in contact with the second facial surface of the dried, colorless release ink layer;
(E) A dried flexo ink layer having first and second facial surfaces, the first facial surface of the flexo ink layer in contact with the second facial surface of the dried second primecoat ink layer and in partial contact with the second facial surface of the dried, colorless release ink layer;
(F) An adhesive layer having first and second facial surfaces, the first facial surface of the adhesive layer in contact with the second facial surface of the dried flexo ink layer; and
(G) An optional release liner with first and second facial surfaces, the first facial surface of the optional release liner in contact with the second facial surface of the adhesive layer.

14. The label of claim 13 further comprising a topcoat in contact with the first facial surface of the facesheet.

15. The label of claim 13 in which the facesheet comprises polyester or a biaxially-oriented polypropylene resin.

16. The label of claim 13 in which the flexo ink is colorless and comprises a silicone wetting agent.

17. A release liner in the form of a roll carrying a plurality labels of claim 13.

* * * * *